US011330613B2

(12) United States Patent
Hawari et al.

(10) Patent No.: US 11,330,613 B2
(45) Date of Patent: May 10, 2022

(54) VIDEO-CALL AWARE UPLINK SCHEDULER USING PENDING IN INTEREST TABLE SNOOPING (71) Applicant: Cisco Technology, Inc., San Jose, CA (US)

(72) Inventors: Mohammed Hawari, Montigny-le-Bretonneux (FR); Jordan Augé, Saint-Cyr-L'ecole (FR); Jacques O. Samain, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/812,819

(22) Filed: Mar. 9, 2020

(65) Prior Publication Data
US 2021/0282166 A1 Sep. 9, 2021

(51) Int. Cl.
H04W 72/12 (2009.01)
(52) U.S. Cl.
CPC ... H04W 72/1268 (2013.01); H04W 72/1236 (2013.01); H04W 72/1252 (2013.01)
(58) Field of Classification Search
CPC ......... H04W 72/1268; H04W 72/1252; H04W 72/1236; H04W 72/1284; H04W 72/1242; H04W 72/048
See application file for complete search history.

(56) References Cited

U.S. PATENT DOCUMENTS

2017/0273099 A1* 9/2017 Zhang ............... H04W 72/1268
2018/0103128 A1* 4/2018 Muscariello ............ H04L 69/22
2018/0145907 A1 5/2018 Vannithamby et al.
2018/0145927 A1 5/2018 Srikanteswara et al.
2018/0145945 A1 5/2018 Gupta Hyde et al.
2018/0146041 A1 5/2018 Moustafa et al.
2018/0146058 A1 5/2018 Somayazulu et al.
2018/0146059 A1 5/2018 Schoenberg et al.
2018/0146060 A1 5/2018 Foerster et al.
2018/0146071 A1 5/2018 Himayat et al.
2018/0146380 A1 5/2018 Srikanteswara et al.
(Continued)

FOREIGN PATENT DOCUMENTS

CN 109863734 A 6/2019
DE 112017005885 T5 8/2019
(Continued)

OTHER PUBLICATIONS

Cuissard, Vincent; Choukir, Amine; Ficara, Domenico; and Valenza, Salvatore, "Access Point Transmission Optimizations Using Machine Learning Based Traffic Classification", Technical Disclosure Commons, (Dec. 10, 2018), 5 pages.
(Continued)

Primary Examiner — Lakeram Jangbahadur
(74) Attorney, Agent, or Firm — Patterson + Sheridan, LLP (57) ABSTRACT Techniques and apparatus for optimizing scheduling of uplink traffic are provided. One technique includes determining, based on evaluation of a pending interest table (PIT) at an apparatus, at least one portion of an uplink traffic flow from a client device that satisfies one or more conditions for periodicity. A resource for the at least one portion of the uplink traffic flow that satisfies the one or more conditions for periodicity. An indication of the resource allocation is transmitted to the client device.

20 Claims, 8 Drawing Sheets (56) References Cited

U.S. PATENT DOCUMENTS

| | | | |
|---|---|---|---|
| 2018/0241679 A1 | 8/2018 | Muscariello et al. | |
| 2018/0242186 A1* | 8/2018 | Muscariello | H04L 67/327 |
| 2019/0327328 A1* | 10/2019 | Smith | H04M 15/00 |
| 2019/0349445 A1 | 11/2019 | Somayazulu et al. | |
| 2019/0364492 A1* | 11/2019 | Azizi | H04W 48/16 |
| 2020/0059529 A1 | 2/2020 | Moustafa et al. | |

FOREIGN PATENT DOCUMENTS

| | | |
|---|---|---|
| EP | 3523945 A1 | 8/2019 |
| EP | 3542565 A2 | 9/2019 |
| WO | 2018067427 A1 | 4/2018 |
| WO | 2018093526 A2 | 5/2018 |
| WO | 2018093813 A1 | 5/2018 |
| WO | 2018156484 A1 | 8/2018 |
| WO | 2018156487 A1 | 8/2018 |

OTHER PUBLICATIONS

Carofiglio, Giovanna, et al. "Pending interest table sizing in named data networking." Proceedings of the 2nd ACM Conference on Information-Centric Networking. ACM, 2015, 10 pages.
I. Moiseenko and D. Oran, "Flow Classification in Information Centric Networking," Jul. 24, 2019, date accessed: Mar. 9, 2020 <https://tools.ietf.org/html/draft-moiseenko-icnrg-flowclass-04>.
Haowei Yuan and Patrick Crowley, "Scalable Pending Interest Table Design: From Principles to Practice," IEEE INFOCOM 2014, pp. 2049-2057.
Samain, Jacques, "Improving quality of experience in multimedia streaming by leveraging Information-Centric Networking," Universite Paris-Saclay, 2019, 172 pages.

* cited by examiner

VIDEO-CALL AWARE UPLINK SCHEDULER USING PENDING IN INTEREST TABLE SNOOPING

TECHNICAL FIELD

Embodiments presented in this disclosure generally relate to wireless communications. More specifically, embodiments disclosed herein provide techniques and apparatus for optimizing uplink scheduling of latency sensitive traffic (e.g., traffic from video-call conference applications) by snooping a pending interest table (PIT) in a hybrid information-centric networking (hICN) based architecture.

BACKGROUND

In order to address the issue of increasing bandwidth requirements demanded for wireless communication systems, different schemes are being developed to allow devices (e.g., access points (APs), client stations (STAs), etc.) to share channel resources while achieving high data throughputs. As an example, wireless communication standards, such as the Institute of Electrical and Electronics Engineers (IEEE) 802.11 standard, support techniques for allocating resources to devices for communications. In the time domain, for example, transmission opportunities (TXOPs) can be allocated to APs and client STAs, e.g., using a medium access control protocol, such as Enhanced Distributed Channel Access (EDCA). The IEEE 802.11 standard denotes a set of Wireless Local Area Network (WLAN) air interface standards developed by the IEEE 802.11 committee for short-range communications (e.g., tens of meters to a few hundred meters).

One issue with medium access control protocols employed by wireless communication systems is that such protocols may not be sufficient for real-time applications, such as video conferencing applications. Many real-time applications, for example, may require low latency networks in order to provide a high Quality of Experience (QoE) to end users. However, due to the indeterministic nature of conventional medium access control protocols, the wireless channels may be challenging (e.g., suffer from noise, interface, fading, etc.) to certain real-time applications. For instance, for a video conferencing application being used in a loaded environment with multiple client STAs, the radio uplink can quickly become a scarce resource and may not always be available to the active speaker. Accordingly, it may be desirable to provide an improved scheduling technique for low-latency sensitive applications.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a computer-implemented method. The method generally includes determining, based on evaluation of a pending interest table (PIT) at the apparatus, at least one portion of an uplink traffic flow from a client device that satisfies one or more conditions for periodicity. The method also includes determining a resource allocation for the at least one portion of the uplink traffic flow that satisfies the one or more conditions for periodicity. The method further includes transmitting an indication of the resource allocation to the client device.

Another embodiment presented in this disclosure is a network device. The network device generally includes a processor and a memory. The memory contains a program that, when executed by the processor performs an operation. The operation includes determining, based on evaluation of a pending interest table (PIT) at the network device, at least one portion of an uplink traffic flow from a client device that satisfies one or more conditions for periodicity. The operation also includes determining a resource allocation for the at least one portion of the uplink traffic flow that satisfies the one or more conditions for periodicity. The operation further includes transmitting an indication of the resource allocation to the client device.

Another embodiment presented in this disclosure is a non-transitory computer-readable storage medium. The non-transitory computer-readable storage medium has computer executable code stored thereon and is executable by one or more processors to perform an operation. The operation includes determining, based on evaluation of a pending interest table (PIT) at the apparatus, at least one portion of an uplink traffic flow from a client device that satisfies one or more conditions for periodicity. The operation also includes determining a resource allocation for the at least one portion of the uplink traffic flow that satisfies the one or more conditions for periodicity The operation further includes transmitting an indication of the resource allocation to the client device.

Example Embodiments

Embodiments herein describe techniques for optimizing uplink scheduling of latency sensitive traffic, such as traffic from video-call conference applications, in a hICN environment. More specifically, embodiments enable a scheduling apparatus (e.g., AP) to leverage information available in a PIT data structure of the scheduling apparatus to optimize the scheduling of uplink traffic from one or more client devices (e.g., client stations (or STAs)).

In some cases, a wireless communication system may employ an ICN architecture. ICN generally refers to an approach to evolve the Internet infrastructure away from a host-centric paradigm based on perpetual connectivity and the end-to-end principle, to a network architecture in which the focal point is named information, content, data, or the like. In an ICN network paradigm, connectivity may well be intermittent such that the end-host and in-network storage can be capitalized upon transparently. As named information in an ICN network an on storage devices can have exactly the same value, mobility and multi access are the norm. Data may become independent from location, application, storage, and means of transportation, enabling in-network caching and replication. The expected benefits can include improved efficiency, better scalability with respect to information and/or bandwidth demand, and better robustness in challenging communication scenarios.

hICN is a developing network technology that provides for mobility and usage of heterogeneous access networks at client devices (e.g., mobile devices). hICN integrates ICN in internet protocol (IP) without using encapsulation or tunneling techniques and without employing an overlay network. According to one embodiment described herein, a scheduling apparatus configured as a hICN device (e.g., supports one or more capabilities of a hICN device) may use a scheduling component to optimize scheduling of wireless uplink traffic from one or more client devices. For example, the scheduling component may use information within the PIT data structure of the scheduling apparatus to identify an uplink traffic flow(s) (also referred to herein as data flow, data, data stream, etc.) that satisfies one or more predetermined conditions. The predetermined condition(s), for example, may include one or more characteristics of a periodic pattern. In periodic traffic, for example, communication events may occur repeatedly at regular intervals within a specified time frame. The scheduling apparatus can be configured to use a variety of techniques, including, for example, statistical methods, spectral analysis, autocorrelation, machine learning techniques, etc., to detect periodicity in network traffic.

Once the periodic flow(s) is identified, the scheduling apparatus can allocate resources for the periodic traffic flow. For example, the scheduling apparatus can create a recurring time slot (or transmission opportunity) in an uplink schedule for the periodic flow(s) to ensure that a sufficient amount of radio resources are available for the client device to send the uplink data (corresponding to the periodic flow). The scheduling apparatus may then transmit an indication of the resource allocation (or allocated resources) to the client device(s). Doing so enables the client device(s) to send data associated with the periodic traffic flow without having to repeatedly request the same recurring time slot, which, in turn, saves radio resources and increases network performance.

Note, the techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an AP or a client STA.

Figure 1:
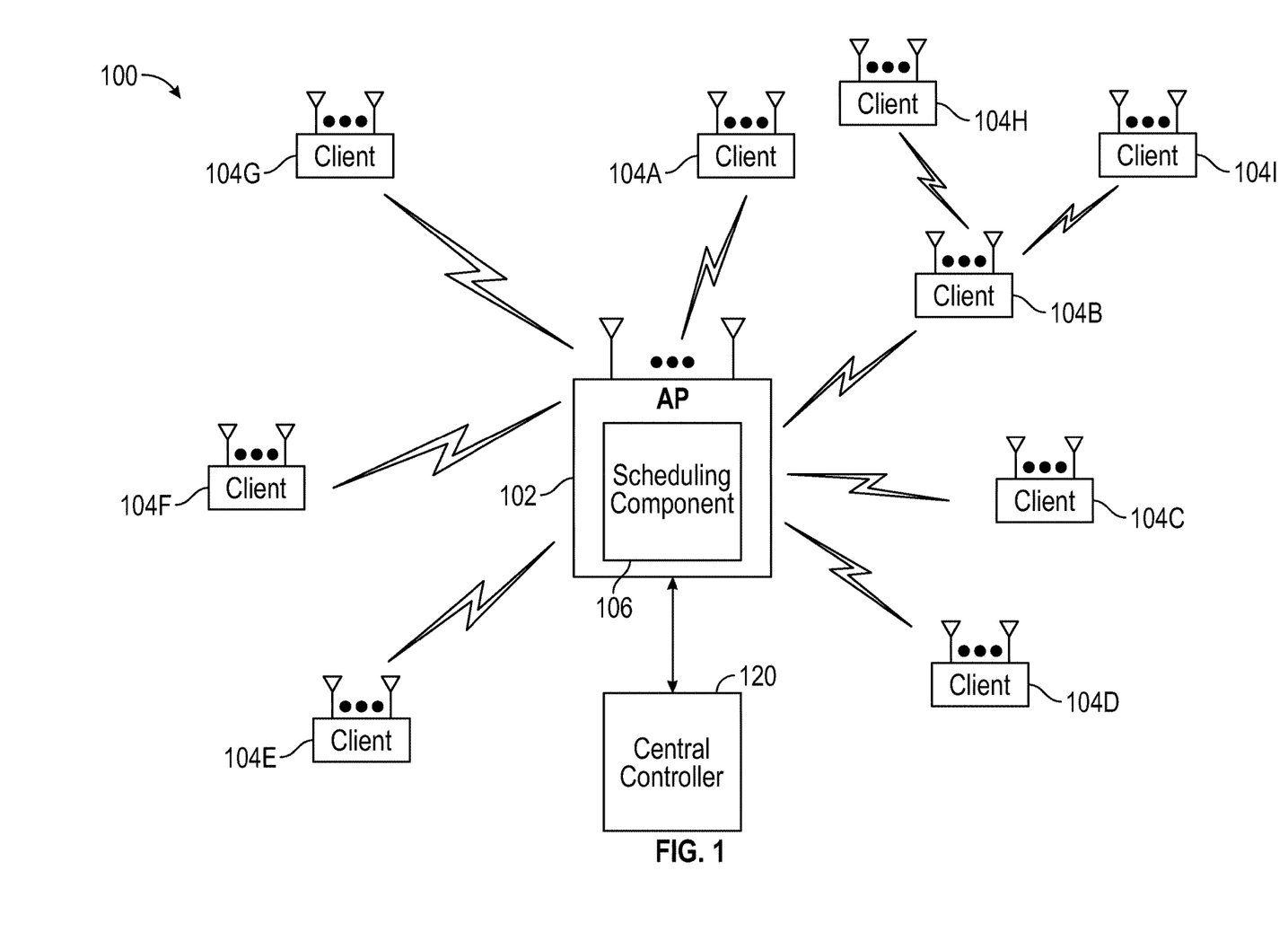
FIG. 1 illustrates an example wireless network, according to one embodiment.

FIG. 1 illustrates an example wireless network 100 in which one or more techniques described herein can be implemented, according to one embodiment. The wireless network 100 includes an AP 102 and client STAs 104A-I. An AP is generally a fixed station that communicates with the client STAs and may also be referred to as a base station, wireless device, wireless node, or some other terminology. A client STA may be fixed or mobile and also may be referred to as a mobile STA, a client, a STA, a wireless device, a wireless node, user device, or some other terminology. Although one AP 102 is depicted, note that the wireless network 100 can include one or more APs 102.

In some embodiments, the client STA may be configured with multiple radio access technologies (RATs) available. Example client STAs include, but are not limited to smart phones, feature phones, tablet computers, laptop computers, desktop computers, Internet of Things (IoT) devices, and the like. The client STA may have network interfaces that include wired links and wireless links for a variety of RATs including, but not limited to: IEEE 802.11 or "WiFi" networks, BLUETOOTH® networks, "cellular" networks (including various generations and subtypes thereof, such as Long Term Evolution (LTE) and Fifth Generation New Radio (5G NR)), Citizens Broadband Radio Service (CBRS) networks, proprietary networks, etc. In some embodiments, the client STA includes one or more network interfaces for each supported RAT (e.g., two WiFi interfaces, one cellular interface, one Bluetooth interface, etc.).

The AP 102 may communicate with one or more client STAs 104A-I on the downlink and uplink. The downlink (e.g., forward link) is the communication link from the AP 102 to the client STAs 104, and the uplink (e.g., reverse link) is the communication link from the client STAs 104 to the AP 102. In some cases, a client STA (e.g., client STA 104B) may also communicate peer-to-peer with another client STA (e.g., client STA 104H, client STA 104I). A central controller 120 couples to and provides coordination and control for the AP(s) 102. For example, the central controller 120 may handle adjustments to radio frequency power, channels, authentication, and security for the AP(s). The central controller 120 may communicate with the AP(s) 102 via a backhaul. The AP(s) 102 may also communicate with one another, e.g., directly or indirectly via a wireless or wireline backhaul.

Here, the AP 102 includes a scheduling component 106, which is configured to implement one or more techniques described herein for optimizing scheduling of uplink traffic from one or more of the client STAs 104. Note that this particular embodiment assumes that the AP 102 is configured as a scheduling apparatus. However, in other embodiments, one of the client STAs 104 can be configured as a scheduling apparatus. In such embodiments, the client STA 104 that is configured as the scheduling apparatus can include a scheduling component 106 to implement one or more techniques described herein for optimizing scheduling of uplink traffic.

Figure 2:
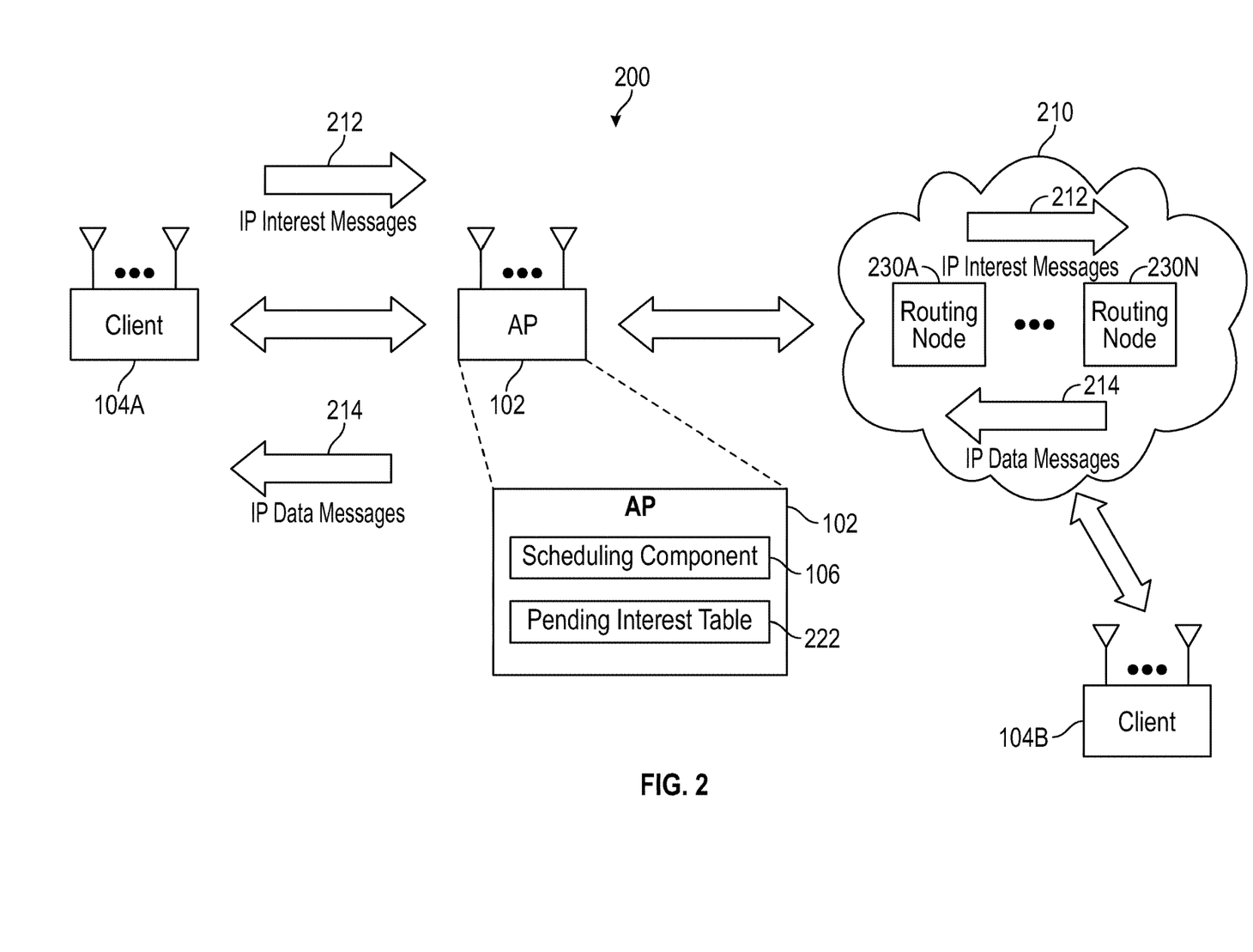
FIG. 2 illustrates an example of an AP and client STA deployed in a hICN architecture for a wireless network, according to one embodiment.

As described in more detail below, the scheduling component 106 can leverage one or more features and data structures of a hICN environment to optimize the scheduling of uplink traffic. As shown in FIG. 2, for example, the AP 102 and/or the client STAs 104 may be deployed in a hICN environment 200, according to embodiments of the present disclosure.

The hICN environment 200 includes client STA 104A, AP 102, hICN network 210, and client STA 104B. In one embodiment, the client STA 104A may act (or be configured) as a consumer node with a consumer application (e.g., video conferencing application) in the hICN environment 200 and the client STA 104B may act (or be configured) as a producer node with a producer application (e.g., video conferencing application) in the hICN environment 200. For example, the client STA 104A (acting as the consumer node) may transmit data to (or receive data from) the client STA 104B (acting as the producer node), via one or more APs 102 A-N (acting as access nodes) and via the routing nodes 230 A-N of hICN network 210. In some examples, the client STA 104A and client STA 104B may be parties in a VOIP or video call (e.g., the client STA 104A and client STA 104B may exchange data as active speakers in the VOIP call). In some examples, the client STA 104B may be a server maintaining or generating the desired data (e.g., a streaming video or music service), a central collector in communication with several client STAs 104 that manages or coordinates communications between the several client STAs 104 (e.g., a video conference server, a multiplayer game server, etc.), and the like.

The client STA 104A may connect to the hICN network 210 via AP 102 (generally an access node) that can be linked to the client STA 104B via one or more paths through the routing nodes 230 A-N within the hICN network 210. Generally, the client STA 104A and the client 104B can communicate through Interest packet 212 and Data packet 214 exchanges via the hICN network 210, which can include any number of hICN and/or ICN routing nodes 230 A-N (generally referred to herein as routing nodes 230). Path segments between adjacent routing nodes 230 can be referred to as 'path links' or simply 'links'. As used herein, a hICN node can refer to any of the client STA 104A (e.g., consumer node), client STA 104B (e.g., producer node), routing nodes 130, and the AP 102 (e.g., access node), and can include network elements such as, routers, switches, or the like.

As noted above, hICN architectures use stateful (e.g., state-based) forwarding of Interest packets 212 and Data packets 214 within a hICN environment 200. This enables the hICN environment 200 to enrich network layer functions with content awareness so that routing, forwarding, caching, and data transfer operations are performed on content names, rather than on locators such as IP addresses. The Interest (I) packet 212 can be used to request a piece of content by content name using a hierarchical tokenized name-prefix, and the Data (D) packet 214 can be used to return the requested named piece of content. As referred to herein, content or data can also be referred to as a "resource" or variations thereof. Note that herein the terms "message" and "packet" and variations thereof can be used interchangeably. Further, the terms 'Data', 'Content', 'Data packet', 'Data message', 'Content packet', 'Content Message', and variations thereof can be used interchangeably in reference to hICN architectures. Similarly, the terms 'Interest', 'Interest packet', and 'Interest message' can be used interchangeably in reference to hICN architectures.

In a hICN environment 200, data can be split into packets, uniquely identified by a content name that can be signed by a data producer such as a producer application provisioned for a given hICN node. A namespace allows content to be referenced by a content name using a name-prefix included in the Interest and Data packets 212, 214. The naming convention (i.e., how to name the content), may not be specified by hICN, but may employ a hierarchical structure.

A name-prefix is a hierarchical tokenized name for content that contains a sequence of name components. For example, the name-prefix/com/example/<medialD>/audio/<frameID>/<segment #> contains six name components with each name component being delineated by a slash '/'. A name can also be encoded into an IP address (IPv4 or IPv6) in hybrid proposals. As illustrated by the <segment #> name component, content can span multiple segments or 'chunks'.

For a content item to be globally accessible, the content item is assigned a globally unique name-prefix. When a consumer application desires particular content, the client can generate an Interest packet 212 that includes the name-prefix of the desired content. In at least some instances, the name-prefix of the requested content may be provided by a user or a consumer application that intends to consume the data.

Communication in a hICN environment is generally driven by consumers, also sometimes referred to as requestors, which can initiate requests for information using Interest packets 212. For example, the client STA 104A can be provisioned with a consumer application, which can request a piece of content by generating and sending an Interest packet 212 into the hICN network 210. The Interest packet 212 can include, at least in part, the content name (e.g., the name-prefix) identifying the content desired by the client STA 104A.

A hICN node that receives an Interest packet 212 can perform matching to determine whether the content is stored at the hICN node or whether the Interest needs to be forwarded to another network element to locate the desired content. The Interest packet 212 can be forwarded along one or more path(s) for a number of hICN faces associated with matching operations performed on the content name (e.g., the name-prefix) included in the Interest packet. Using the content name, hICN nodes can forward the Interest packet 212 toward the desired content. The desired content may be found at a particular source that produced the content or at another hICN node (e.g., a routing node 130) along a path to the source. Content carried in the packets can be stored, permanently or temporarily, in one or more nodes in a hICN environment 200.

A source that produces content can be referred to herein interchangeably as a 'content source', 'producer application', 'content producer', 'producer node', a 'producer', a data or content 'responder', or variations thereof. A recipient of content that has been requested can be referred to herein interchangeably as a 'consumer', 'consumer application', 'consumer node', 'receiver', 'requestor' or variations thereof.

In some cases, if no routing node 230 has the requested content to satisfy the Interest packet 212, the Interest packet 212 may be forwarded all way the way to the client STA 104B (producer node) hosting the producer application for that content. When an Interest packet 212 reaches a network element that contains the desired content (either a routing node 230 or client STA 104B), the network element generates a Data packet 214 that includes the content name (e.g., the name-prefix) and the desired content to satisfy the Interest packet 212. To reach the consumer that requested the content (e.g., client STA 104A), the Data packet 214 follows the reverse path taken by the Interest packet 212. In this manner, client STAs can retrieve data using a pull flow control protocol based on packet queries (e.g., Interest packets), triggering corresponding Data packet 214 delivery.

In embodiments herein, the AP 102 may be configured to perform one or more hICN-based operations. As shown, the AP 102 includes a scheduling component 106 and a pending interest table (PIT) 222. The PIT 222 is generally a Layer-3 (L3) data structure present in hICN devices (e.g., routers) that holds information about Interest packets (e.g., Interest packets 212) received by the hICN node along with metadata information, such as receive timestamp(s) and interface (s). Compared to a regular queue holding packets that are available for transmission (as in conventional networks), the PIT 222 of a hICN node holds Interest packets 212 that are pending, meaning that no matching Data packet 214 has been received by that hICN node. That is, an entry is added into the PIT 222 when a new Interest packet 212 arrives and the entry is removed when it is satisfied by reception of a corresponding Data packet 214. As such, the PIT 222 offers a small memory of the recent past, which for one side (e.g., AP 102) provides information about the traffic being carried by the link.

In general, if the given hICN node determines that there is no existing entry in the PIT 222 for the content name, a new entry is created in the PIT 222 that includes, at least in part, the content name included in the received Interest, an identifier for the ICN face upon which the Interest was received, and a timestamp indicating when the Interest was received by the hICN node. For each arriving Data packet 214, the given hICN node can perform a PIT lookup to determine whether an entry is included in the PIT 222 that matches the content name (e.g., the name-prefix) included in the Data packet 214 and, based on a determination that an entry in the PIT 222 does match the content name included in the Data packet 214, forward the Data packet 214 using all ICN face(s) identified in the PIT entry. The PIT entry can then be removed from the PIT 222 as the Interest is no longer pending, but has been served. Based on a determination that a content name included in a received Data packet 214 is not contained in the PIT 222, the Data packet 214 can be discarded. As such, the PIT 222 provides for mobility of data with request aggregation and in-network flow/congestion control.

In conventional medium access protocols, a client STA typically sends a request for radio resources to send uplink traffic to a scheduling apparatus (e.g., AP 102) and, in response, the scheduling apparatus allocates radio resources to the client STA. However, as noted above, this conventional method of allocating resources may not be sufficient for real-time applications that require a high QoE (e.g., above a threshold). Accordingly, embodiments described herein provide techniques that enable a scheduling apparatus (e.g., AP 102) to leverage data structures within a hICN environment, such as the PIT 222, to optimize scheduling of uplink traffic.

In one embodiment, instead of allocating resources based on requests received from the client STA 104A, the AP 102 can use the scheduling component 106 to allocate resources based on information contained in the PIT 222. For example, the scheduling component 106 can use the information in the PIT 222 to identify recurring periodic flows of uplink traffic from the client STA 104A. As a reference example, the recurring periodic flow may correspond to active speaker video requests in the context of a live video conferencing session between the client 104A and the client 104B. The scheduling component 106 can snoop (or analyze) information in the PIT 222 to determine (or obtain an indication of) the traffic at the AP 102. For example, by looking at the Interests present in the PIT 222 over a window of time, the AP 102 can infer on the periodicity of the different flows. Because the PIT 222 is a data structure that is generally present and managed by a hICN node, using the PIT 222 to perform traffic analysis may not require additional data structures and associated management overhead. For example, the PIT 222 can generally be implemented efficiently, minimizing its impact on packet processing (compared to, e.g., a vector packet processing (VPP)-based hICN forwarder).

The scheduling component 106 can observe Interest packets 212 in the PIT 222 that have the same name prefix with an increasing sequence number over time. Based on the observation, the scheduling component 106 can determine whether the temporal pattern of the flows (or at least one or more components of the flow) is periodic. Depending on the context and expected traffic, the scheduling component 106 can use a variety of techniques to identify periodicity in traffic.

One example statistical technique for identifying periodicity may involve computing the standard deviation of the time between successive Interest packets 212 having the same name-prefix (determined based on the difference in timestamps) in the PIT 222. If the value is below a certain predetermined threshold, the traffic associated with those Interest packets 212 may be considered periodic. On the other hand, if the value is above the predetermined threshold, the traffic may not be considered periodic.

One example spectral analysis technique for identifying periodicity may involve calculating the Discrete Fourier Transform (DFT) or Fast Fourier Transform (FFT) for a time series. The DFT or FFT can be used to generate a periodogram or a frequency spectrum analysis to identify periodic patterns. One autocorrelation technique involves calculating the autocorrelation of a time series to identify potential periods. For example, in this technique, traffic may be considered periodic if the autocorrelation is above a certain predetermined threshold. Note, however, that these techniques are provided as merely reference examples of techniques that can be used to identify periodicity.

Figure 3:
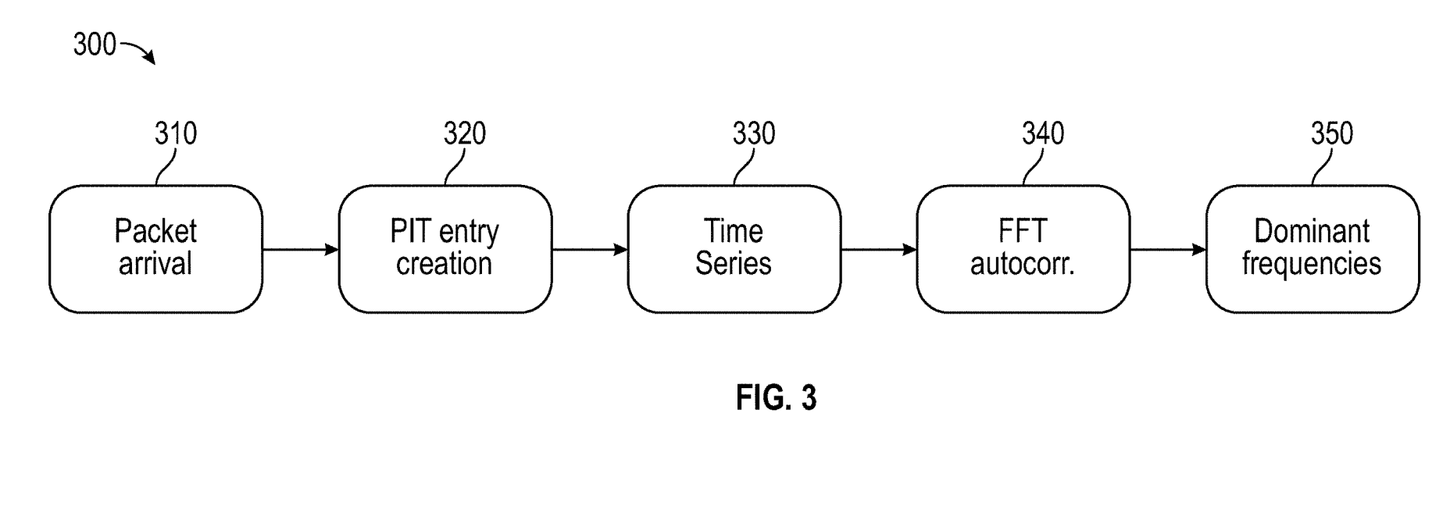
FIG. 3 illustrates an example workflow for performing synchronous traffic analysis of a PIT, according to one embodiment.

In one embodiment, the scheduling component 106 may perform traffic analysis synchronously (e.g., at each packet arrival) using the PIT 222. FIG. 3 illustrates one example workflow 300 for a synchronous mode of operation, according to one embodiment. As shown, after a packet arrival at 310, the scheduling component 106 can create an entry in the PIT 222 (320). At 330, the scheduling component 106 identifies a time series, based on the name prefix of the packet received at 310, and analyze the time series using a combination of autocorrelation and Fast Fourier Transform (FFT) techniques (340) to identify the dominant frequencies (350), which may be indicative of the periodic components of the traffic. The synchronous mode may be performed at line rate and can be used to identify a periodic flow and/or identify periodic subcomponent of a traffic flow. For example, an audio traffic flow may produce data packets at a constant bit rate, and the scheduling component 106 may identify the audio traffic flow as a periodic flow. However, in another example, a MPEG video may include a superposition of periodic traffic of regular frame data in addition to other components on a slower timescale corresponding to I-frames. In this example, the scheduling component 106 can identify the I-frames components as periodic subcomponents of the video frame data.

In another embodiment, the scheduling component 106 may perform traffic analysis asynchronously. In this embodiment, as opposed to inspecting the PIT 222 each time a packet is received, the scheduling component 106 may inspect a state of the PIT 222 at a predefined time interval (e.g., every second, every minute, etc.). In some embodiments, the scheduling component 106 may piggyback on an existing background mechanism that is implemented on hICN nodes to purge expired entries in the PIT 222. For example, as part of this background mechanism, PIT entries that are no longer valid (e.g., expired due to not receiving a response within a certain time period) may be purged (or deleted) from the PIT 222. In embodiments herein, the scheduling component 106 may piggyback on this background mechanism by inspecting the state of the PIT 222 whenever the background mechanism is used (or invoked). Doing so allows for the PIT 222 to be inspected at infrequent intervals, which in turn, allows for a lower CPU usage while still providing an acceptable latency in recognizing periodic flows (e.g., assuming the periodicity is quasi-stationary).

In yet another embodiment, the scheduling component 106 may perform traffic analysis using an adaptive mode. For example, the scheduling component 106 can perform the traffic analysis using synchronous mode if there is a low data rate and switch to the asynchronous mode if there is a high data rate, or vice versa. Regardless of the particular mode that is employed, the scheduling component 106 in general can use the presence of hICN name prefixes in packet headers (e.g., as opposed to IP addresses) to perform the traffic analysis. The name prefixes allow the scheduling component 106 to efficiently identify a flow pattern. For example, since retransmissions (due to packet losses) are also identified by the same name prefix, the scheduling component 106 can efficiently identify the intrinsic periodic pattern of the flow, enabling it to select those that are eligible to a scheduled slot. In yet another example, the name prefixes allow for matching traffic against a whitelist of reserved prefixes for certain types of traffic (e.g., video conferencing calls). In yet another example, the name prefixes allow the scheduling component 106 to filter in/out flows for analysis, which can reduce the load on the traffic analysis.

Once a periodic flow is identified, the scheduling component 106 can schedule a resource allocation for the periodic flow. For example, the scheduling component 106 can create a recurring slot in an uplink schedule for the periodic flow to ensure that a sufficient amount of radio resources are available for the client STA 104A (e.g., active speaker in a video conferencing session). The scheduling component 106 can send an indication of the resource allocation (e.g., recurring slot) to the client STA 104A, which can use the resource allocation to send the periodic uplink traffic. In this manner, the client STA 104A can refrain from periodically requesting the same resource allocation, thereby saving radio resources.

As noted above, because, in some cases, a flow may be composed of one or more periodic subcomponents, the scheduling component 106 can be configured to perform the resource allocation for one or more of the periodic subcomponents. This enables the client STA 104A to request additional (on-demand) resources for components of the flow that do not have allocated resources. For example, the client STA 104A may be able to request additional slots to complement its allocated resources for periodic traffic in order to fit its traffic requirements. The scheduling component 106 can allocate either slot (e.g., periodic or on-demand) in small bursts to allow for less frequency radio wake-ups on the client, but still sufficient enough to provide a high QoE for the traffic from the client STA 104A.

In some embodiments, the scheduling component 106 can monitor the information in PIT 222 to reduce (or even prevent) the saturation of radio resources. For example, to reduce the likelihood of saturation of radio resources (which can lead to starvation of other client STAs 104), the scheduling component 106 can monitor the pending Interests in the PIT 222 to ensure that the pending Interests are not allocated an amount of resources above a threshold amount of resources. The threshold amount of resources may be determined based in part on a quality of the link, a number of client STAs, types of traffic, etc. If a saturation condition does occur (e.g., a client STA 104 is allocated an amount of resources above a threshold amount of resources), the scheduling component 106 may grant the slot reservation to the client STA for the maximum allowed ratio (determined based on the available resources). The client STA can detect this occurrence, and can determine to adapt (e.g., reduce) its rate of sending uplink traffic (e.g., a video rate) or transition to the normal ad-hoc resource reservation. In this manner, the scheduling component 106 can provide feedback to client STAs on their usage of radio resources and provide an incentive to implement proper rate control.

In some embodiments, the scheduling component 106 can identify an overload situation and take one or more actions to resolve the overload situation. The scheduling component 106 may identify an overload situation if there is (i) a high load (corresponding to a number of active flows above a threshold) and/or (ii) a sustained contention (e.g., a number of flows have a periodic rate that exceeds a threshold allocation). In an overload situation, one or more of the client STAs may not receive their desired resource allocation. That is, the scheduling component 106 may revert to an ad-hoc resource reservation mechanism for the impacted client STA(s).

In some overload situations, some client STA(s) may not have full visibility on the concurrent flows, and thus, might make suboptimal decisions in adapting their traffic flows. Accordingly, in some embodiments, the scheduling component 106 can be configured to detect which traffic flow(s) (e.g., from a given application of the client STA 104) is causing the overload situation. In one particular embodiment, the scheduling component 106 can use a DASH-SAND protocol (or similar protocols) to identify applications that are sending latency-sensitive traffic (e.g., video conferencing traffic). Assuming the application is a video conferencing application, in the case of an overload, the AP can establish the current demand (e.g., based on the name-prefixes) and proactively indicate (e.g., using DASH-SAND protocol) to the client STA (e.g., active speaker) to lower its video quality as to ensure a QoE below a threshold based on an estimation of the maximum achievable throughput on the uplink for a give client STA.

Figure 4:
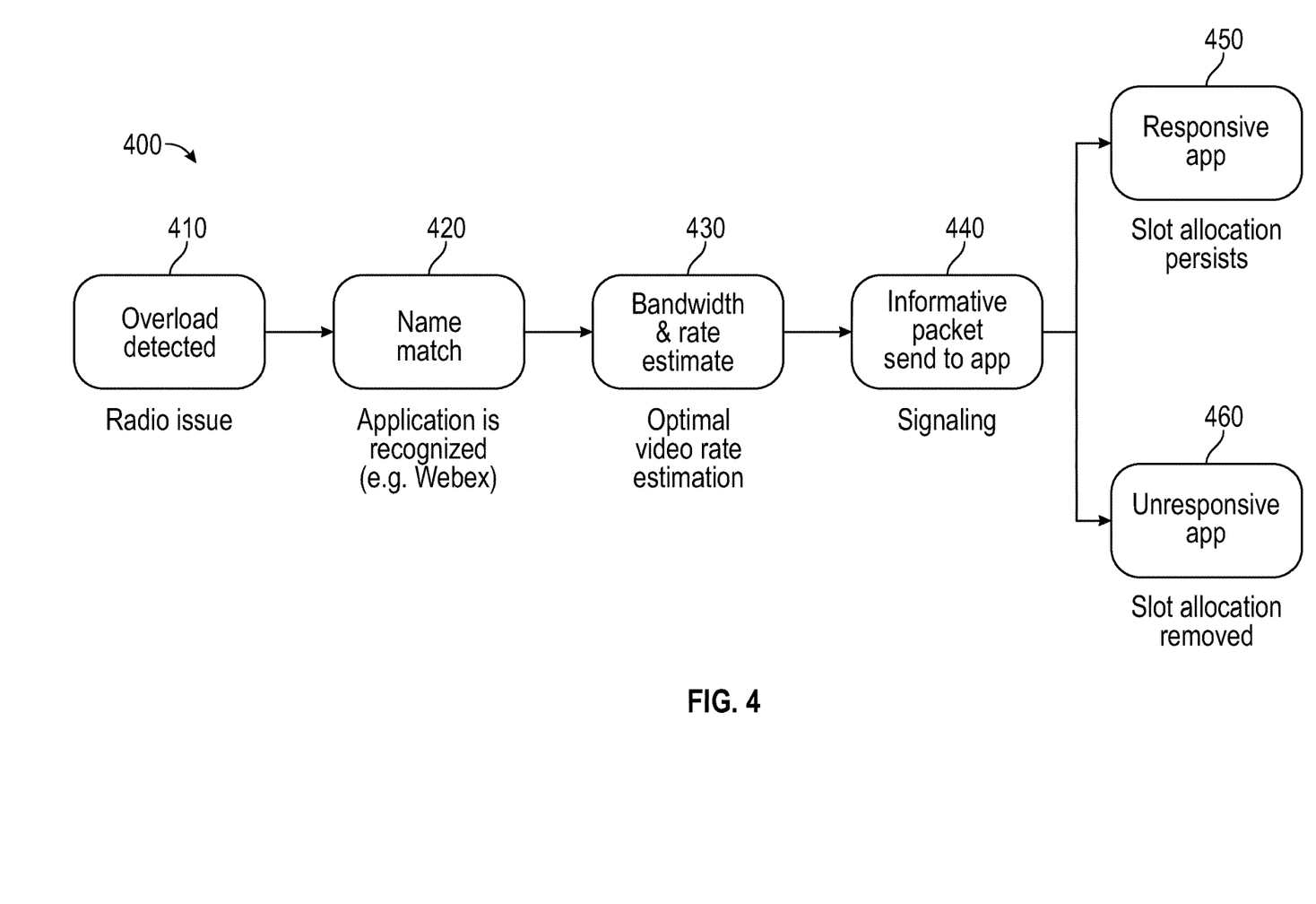
FIG. 4 illustrates an example workflow for resolving an overload condition, according to one embodiment.

FIG. 4 illustrates one example workflow 400 for resolving an overload condition, according to one embodiment. As shown, at 410, the scheduling component 106 detects an overload (e.g., there may be an issue with the radio environment impacting the amount of traffic that can be carried on the link). At 420, the scheduling component 106 performs a name match (of the name-prefixes within the PIT 222) to determine the application of the client STA 104 causing the overload. At 430, the scheduling component 106 signals an indication of the overload to the application of the client STA 104.

If the scheduling component 106 determines that the application has adjusted its usage of radio resources (e.g., by reducing bitrate of video), then the scheduling component 106 continues to allocate resources for the periodic traffic of the client STA 104 (450). On the other hand, if the scheduling component 106 determines that the application is unresponsive (e.g., the application has not adjusted its usage of radio resources), the scheduling component 106 halts the allocation of resources for the periodic traffic of the client STA 104 (460), and reverts to an ad-hoc mechanism for scheduling uplink traffic (e.g., associated with conventional medium access protocols).

Figure 5:
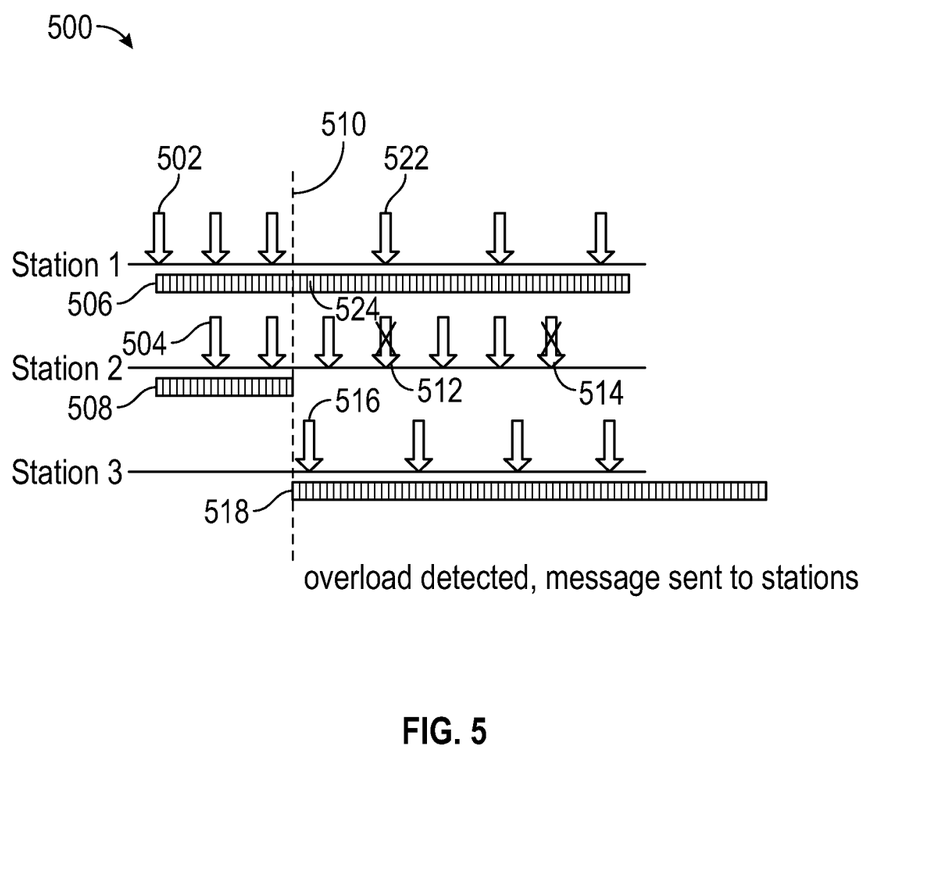
FIG. 5 illustrates an example scenario of an AP optimizing uplink scheduling of one or more client STAs, according to one embodiment.

FIG. 5 illustrates an example scenario 500 of an AP 102 optimizing uplink scheduling of one or more client STAs 104, according to one embodiment. In this embodiment, client STAs 1-2 may transmit uplink data at a high periodic rate (e.g., above a threshold rate) as illustrated (by packet arrivals) at 502 and 504, respectively, and receive a periodic slot allocation as illustrated at 506 and 508, respectively, from the AP 102. In this case, the AP 102 may schedule the periodic slot allocations, in response to determining that the periodic slot allocations are below a threshold amount of link resources.

When client STA 3 joins, client STA 3 starts sending periodic traffic at a lower periodic rate (e.g., above the threshold rate) as illustrated (by packet arrivals at 516) and is given a periodic slot allocation (as illustrated at 518). However, at the same time, when client STA 3 joins, the link becomes overloaded (at 510) (e.g., due to the demand from client STAs 1-3 being greater than the current radio capacity). Despite the traffic from the client STAs 1-3 being periodic, the AP 102 may not be able to schedule slots for all the traffic flows with their current rates without traffic being dropped.

Here, in response to detecting the overload at 510, the AP 102 sends a message to client STAs 1-2 requesting the client STAs 1-2 to reduce their rate. In response to the message, client STA 1 adapts (e.g., lowers) its rate as illustrated by packet arrivals at 522, and continues to receive a periodic slot allocation from the AP 102 (as illustrated at 524). Client STA 2, however, does not adapt its rate, which causes it to lose its slot allocation from the AP 102. As a result of losing its slot allocation, some of the uplink packets from the client STA 2 may be dropped impacting QoE (e.g., due to not receive a transmission opportunity for the traffic, as illustrated at 512 and 514).

Although not shown in FIG. 5, in some embodiments, the AP 102 could respond to the overload situation by removing the slot assignment to client STAs 1-2 that have higher periodic rates. In this case, the removal of the slot assignment may implicitly indicate to client STAs 1-2 that an overload situation occurred. Client STA 3, on the other hand, may continue to send its traffic (e.g., using its slot assignment) since it is transmitting at a lower rate (below a threshold).

Figure 6:
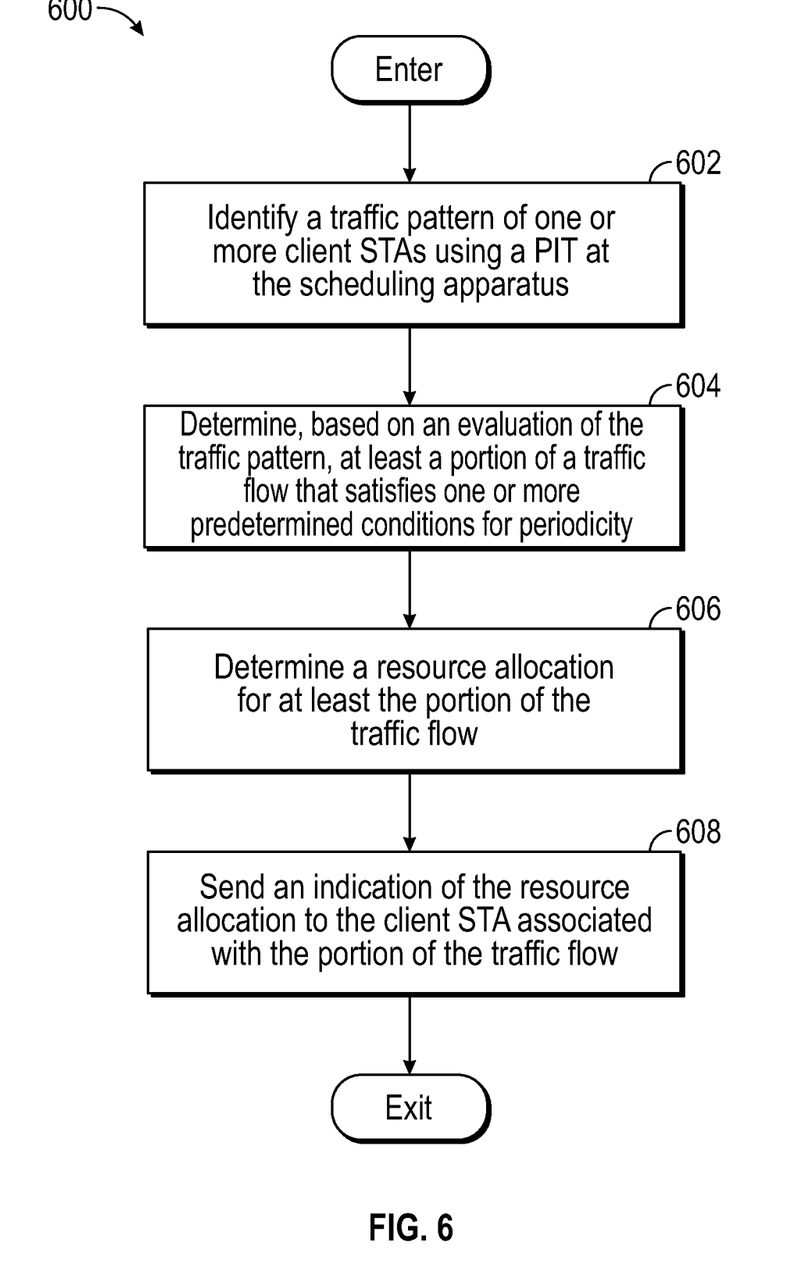
FIG. 6 is a flowchart of a method for optimizing uplink scheduling of one or more client STAs, according to one embodiment.

FIG. 6 is a flowchart of a method 600 for optimizing uplink scheduling of one or more client STAs (e.g., client STAs 104). The method 600 may be performed by a scheduling apparatus (e.g., AP 102). The scheduling apparatus, in one embodiment, may be configured as a hICN node.

Method 600 may enter at block 602, where the scheduling apparatus identifies a traffic pattern of one or more client STAs using a PIT (e.g., PIT 222) at the scheduling apparatus. In one embodiment, the scheduling apparatus may evaluate the PIT synchronously (e.g., each time a packet is received from a client STA). In another embodiment, the scheduling apparatus may evaluate the PIT asynchronously (e.g., based on a time interval).

At block 604, the scheduling apparatus determines, based on an evaluation of the traffic pattern, at least a portion of a traffic flow that satisfies one or more predetermined conditions for periodicity. As noted, periodic traffic may include repeated occurrences of an "event" (e.g., packet transmission) at regularly-spaced time intervals. One example characteristic (or attribute) of periodic traffic can include the time between each subsequent set of Interested packets 212 (within the PIT 222) being approximately equal (or within some threshold range). As an example, assume the PIT 222 includes ten Interested packets with the same name prefix. In this example, the scheduling apparatus may determine, based on the timestamps associated with each of the Interested packets, that the ten Interested packets have characteristics of a periodic flow. For example, the time between each subsequent set of Interested packets in the PIT 222 may be within a predefined range (e.g., 1 to 2 seconds). At the same time, the PIT 222 may include other Interested packets that the scheduling apparatus determines are characteristic of non-periodic data transmissions (e.g., the time between each subsequent set of Interested packets is outside a predefined range).

At block 606, the scheduling apparatus determines a resource allocation for at least the portion of the traffic flow that satisfies the one or more predetermined conditions. For example, in one embodiment, the scheduling apparatus can create a recurring timeslot in an uplink schedule for at least the portion of the traffic flow. At block 608, the scheduling apparatus sends an indication of the resource allocation to the one or more client STAs.

Figure 7:
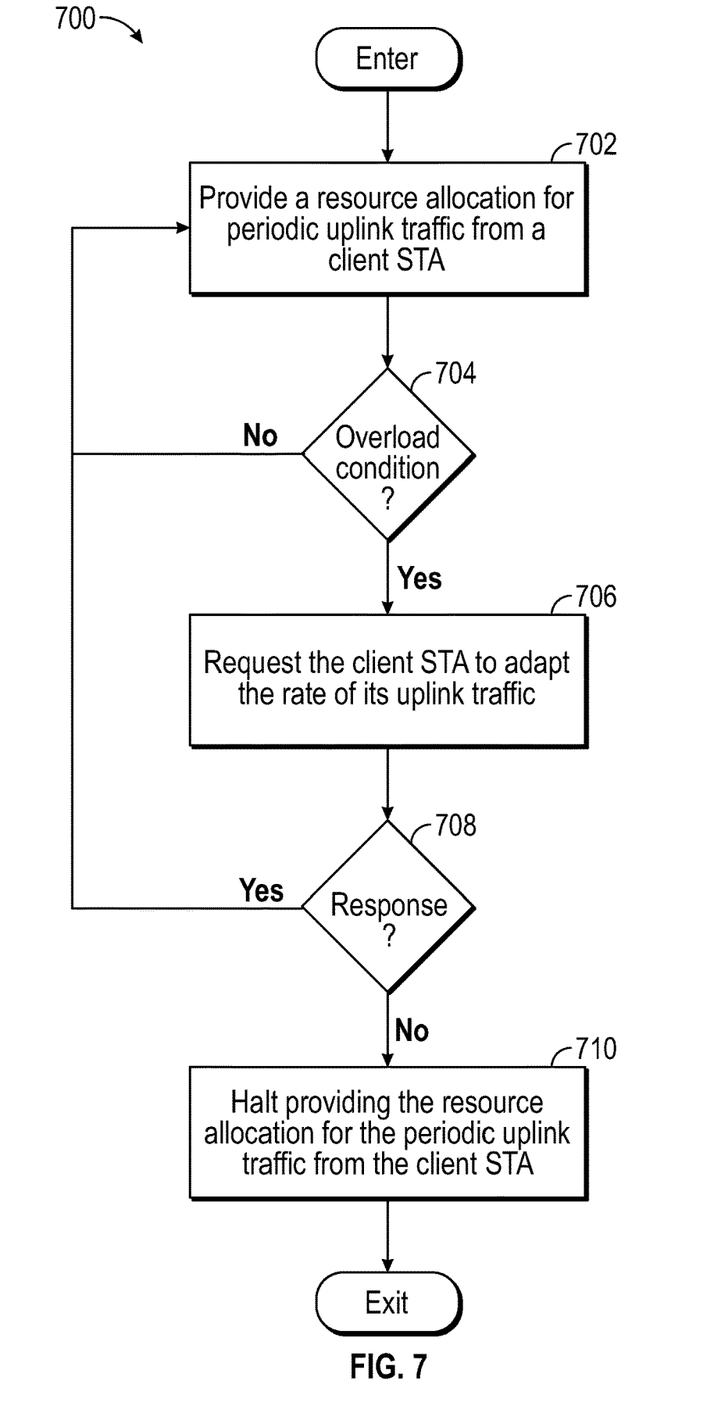
FIG. 7 is a flowchart of a method for resolving an overload condition, according to one embodiment.

FIG. 7 is a flowchart of a method 700 for resolving an overload condition, according to one embodiment. The method 700 may be performed by a scheduling apparatus (e.g., AP 102). The scheduling apparatus, in one embodiment, may be configured as a hICN node.

Method 700 may enter at block 702, where the scheduling apparatus provides a (first) resource allocation for periodic uplink traffic from a (first) client STA. At block 704, the scheduling apparatus determines whether an overload condition has been detected. In one embodiment, the overload condition may be an amount of resources in use being above a threshold amount of resources that can be supported for a communication link. This can be due, e.g., to another (second) client STA joining and sending uplink traffic to the scheduling apparatus, the (first) client STA sending uplink traffic at a high rate (e.g., above a threshold rate), etc. In another embodiment, the overload condition may be one or more client STAs (e.g., first client STA) using an amount of resources above a threshold amount of resources (e.g., the client STA is allocated an unfair amount of resources (predetermined by the scheduling apparatus) relative to other client STAs). In another embodiment, the overload condition may be a quality of the communication link satisfying a condition (e.g., the amount of noise on the communication link is above a threshold).

If an overload condition is not detected, then the scheduling apparatus continues to provide the resource allocation for the periodic uplink traffic from the client STA (block 702). On the other hand, if an overload condition is detected, then the scheduling apparatus sends a message to the client STA requesting the client STA to adapt (or adjust) the rate of its uplink traffic (block 706). At block 708, the scheduling apparatus determines whether the client STA has reduced the rate of its uplink traffic. If so, the scheduling apparatus continues to provide the resource allocation for the periodic uplink traffic (block 702). On the other hand, if the scheduling apparatus determines that the client STA has not reduced the rate of its uplink traffic, the scheduling apparatus halts (or removes) the resource allocation for the periodic uplink traffic (block 710). In one embodiment, after halting the resource allocation, the scheduling apparatus may allocate resources to the client STA according to a conventional medium access control protocol. The method 700 may then exit.

Figure 8:
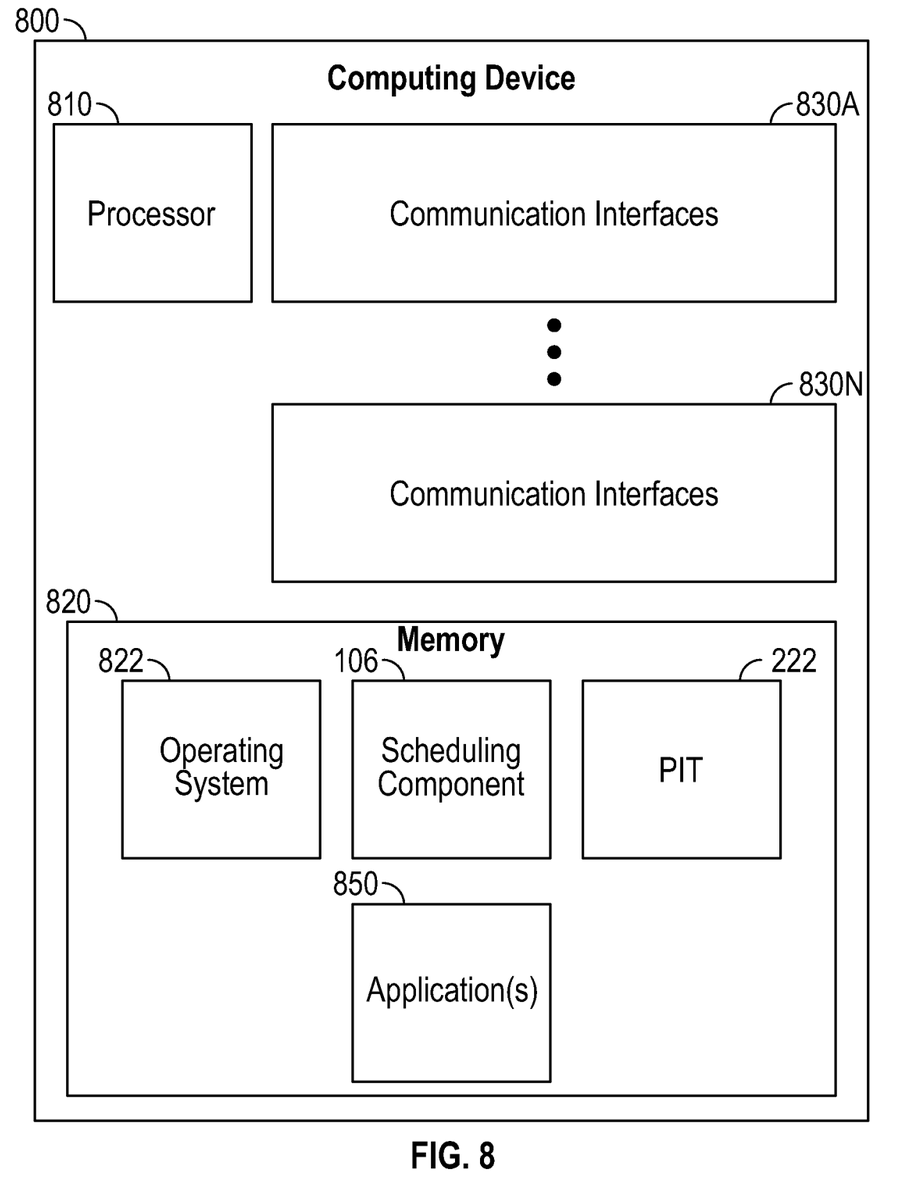
FIG. 8 illustrates an example computing device, according to one embodiment.

FIG. 8 illustrates an example computing device 800, according to one embodiment. The computing device 800 may be a hICN node that is configured to perform one or more techniques described herein for optimizing scheduling of uplink traffic. The computing device 800 includes a processor 810, a memory 820, and one or more communication interfaces 830a-n (generally, communication interface 830). In various embodiments, the computing device 800 may represent a user device, a server, a router, an access node or any other computing device connected to or part of a hICN network 210.

The processor 810 may be any processing element capable of performing the functions described herein. The processor 810 represents a single processor, multiple processors, a processor with multiple cores, and combinations thereof. The communication interfaces 830 facilitate communications between the computing device 800 and other devices. The communications interfaces 830 are representative of wireless communications antennas and various wired communication ports. The memory 820 may be either volatile or non-volatile memory and may include RAM, flash, cache, disk drives, and other computer readable memory storage devices. Although shown as a single entity, the memory 820 may be divided into different memory storage elements such as RAM and one or more hard disk drives.

As shown, the memory 820 includes various instructions that are executable by the processor 810 to provide an operating system 822 to manage various functions of the computing device 800. As shown, the memory 820 includes an operation system 822, a scheduling component 106, one or more applications 850, and a PIT 222, described in more detail above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method performed by an apparatus, comprising:
   determining, based on evaluation of a pending interest table (PIT) at the apparatus, at least one portion of an uplink traffic flow from a client device that satisfies one or more conditions for periodicity;
   determining a resource allocation for the at least one portion of the uplink traffic flow that satisfies the one or more conditions for periodicity;
   transmitting an indication of the resource allocation to the client device;
   detecting an overload on a communication link between the client device and the apparatus, comprising determining that an amount of resources allocated to one or more client devices is above a threshold amount of resources; and
   in response to detecting the overload, transmitting a message to the client device requesting the client device to adjust a rate of the uplink traffic flow.

2. The computer-implemented method of claim 1, further comprising receiving the at least one portion of the uplink traffic flow from the client device on the resource allocation.

3. The computer-implemented method of claim 1, wherein the PIT is evaluated each time a packet is received by the apparatus from the client device.

4. The computer-implemented method of claim 1, wherein the PIT is evaluated at a predetermined time interval.

5. The computer-implemented method of claim 1, wherein the PIT is evaluated when a background process is invoked to purge one or more entries from the PIT.

6. The computer-implemented method of claim 1, further comprising:
   after transmitting the message, detecting that the client device has adjusted the rate of the uplink traffic flow; and
   continuing to provide the resource allocation for the at least one portion of the uplink traffic flow that is periodic, in response to detecting that the client device has adjusted the rate of the uplink traffic flow.

7. The computer-implemented method of claim 1, further comprising:
   after transmitting the message, determining that the client device has not adjusted the rate of the uplink traffic flow; and
   halting the resource allocation for the at least one portion of the uplink traffic flow that is periodic.

8. A network device comprising:
   a processor; and
   a memory containing a program that, when executed by the processor, performs an operation comprising:
   determining, based on evaluation of a pending interest table (PIT) at the network device, at least one portion of an uplink traffic flow from a client device that satisfies one or more conditions for periodicity;
   determining a resource allocation for the at least one portion of the uplink traffic flow that satisfies the one or more conditions for periodicity;
   transmitting an indication of the resource allocation to the client device;
   detecting an overload on a communication link between the client device and the network device, comprising determining that an amount of resources allocated to one or more client devices is above a threshold amount of resources; and
   in response to detecting the overload, transmitting a message to the client device requesting the client device to adjust a rate of the uplink traffic flow.

9. The network device of claim 8, the operation further comprising receiving the at least one portion of the uplink traffic flow from the client device on the resource allocation.

10. The network device of claim 8, wherein the PIT is evaluated each time a packet is received by the network device from the client device.

11. The network device of claim 8, wherein the PIT is evaluated at a predetermined time interval.

12. The network device of claim 8, wherein the PIT is evaluated when a background process is invoked to purge one or more entries from the PIT.

13. The network device of claim 8, the operation further comprising:
    after transmitting the message, detecting that the client device has adjusted the rate of the uplink traffic flow; and
    continuing to provide the resource allocation for the at least one portion of the uplink traffic flow that is periodic, in response to detecting that the client device has adjusted the rate of the uplink traffic flow.

14. The network device of claim 8, the operation further comprising:
    after transmitting the message, determining that the client device has not adjusted the rate of the uplink traffic flow; and
    halting the resource allocation for the at least one portion of the uplink traffic flow that is periodic.

15. A non-transitory computer readable storage medium having computer executable code stored thereon, the computer executable code being executable by one or more processors to perform an operation by an apparatus, the operation comprising:
    determining, based on evaluation of a pending interest table (PIT) at the apparatus, at least one portion of an uplink traffic flow from a client device that satisfies one or more conditions for periodicity;
    determining a resource allocation for the at least one portion of the uplink traffic flow that satisfies the one or more conditions for periodicity;
    transmitting an indication of the resource allocation to the client device;
    detecting an overload on a communication link between the client device and the apparatus, comprising determining that an amount of resources allocated to one or more client devices is above a threshold amount of resources; and
    in response to detecting the overload, transmitting a message to the client device requesting the client device to adjust a rate of the uplink traffic flow.

16. The non-transitory computer readable storage medium of claim 15, the operation further comprising receiving the at least one portion of the uplink traffic flow from the client device on the resource allocation.

17. The non-transitory computer readable storage medium of claim 15, wherein the PIT is evaluated each time a packet is received by the apparatus from the client device.

18. The non-transitory computer readable storage medium of claim 15, wherein the PIT is evaluated at a predetermined time interval.

19. The non-transitory computer readable storage medium of claim 15, the operation further comprising:
   after transmitting the message, detecting that the client device has adjusted the rate of the uplink traffic flow; and
   continuing to provide the resource allocation for the at least one portion of the uplink traffic flow that is periodic, in response to detecting that the client device has adjusted the rate of the uplink traffic flow.

20. The non-transitory computer readable storage medium of claim 15, the operation further comprising:
   after transmitting the message, determining that the client device has not adjusted the rate of the uplink traffic flow; and
   halting the resource allocation for the at least one portion of the uplink traffic flow that is periodic.

* * * * *

UNITED STATES PATENT AND TRADEMARK OFFICE
CERTIFICATE OF CORRECTION

| | |
|---|---|
| PATENT NO. | : 11,330,613 B2 |
| APPLICATION NO. | : 16/812819 |
| DATED | : May 10, 2022 |
| INVENTOR(S) | : Mohammed Hawari et al. |

It is certified that error appears in the above-identified patent and that said Letters Patent is hereby corrected as shown below:

On the Title Page

Item (54), in Column 1, in "Title", Line 2, delete "PENDING IN" and insert -- PENDING --.

In the Specification

In Column 1, Line 2, delete "PENDING IN" and insert -- PENDING --.

In Column 6, Line 4, delete "<segment #>" and insert -- <segment#> --.

In Column 6, Line 7, delete "<segment #>" and insert -- <segment#> --.

Signed and Sealed this
Seventh Day of March, 2023

Katherine Kelly Vidal
*Director of the United States Patent and Trademark Office*